United States Patent [19]

Durston

[11] 4,043,866

[45] Aug. 23, 1977

[54] LIQUID METAL COOLED FAST BREEDER NUCLEAR REACTORS

[75] Inventor: John Graham Durston, Northwich, England

[73] Assignee: United Kingdom Atomic Energy Authority, London, England

[21] Appl. No.: 526,822

[22] Filed: Nov. 25, 1974

[30] Foreign Application Priority Data

Dec. 6, 1973   United Kingdom ............... 56704/73

[51] Int. Cl.² .............................................. G21C 1/02
[52] U.S. Cl. ...................................... 176/40; 176/62; 176/65; 176/87
[58] Field of Search ....................... 176/17, 18, 40, 62, 176/63, 65, 87, 28; 165/74, 81; 122/235 G

[56] References Cited

U.S. PATENT DOCUMENTS 3,498,880   3/1970   Gollion .................................. 176/65
3,784,443   1/1974   Vercusson ............................. 176/40

Primary Examiner—Verlin R. Pendegrass
Assistant Examiner—S. A. Cangialosi
Attorney, Agent, or Firm—Larson, Taylor and Hinds

[57] ABSTRACT

A liquid metal fast breeder nuclear reactor of the pool kind. The intermediate heat exchanger depends from the roof of the primary vessel in a housing and is immersed in the reactor coolant. A gas pocket seals the passage between the heat exchanger shell and the housing to prevent liquid metal by-passing the tube bundle.

3 Claims, 2 Drawing Figures

LIQUID METAL COOLED FAST BREEDER NUCLEAR REACTORS

BACKGROUND OF THE INVENTION

This invention relates to liquid metal cooled fast breeder nuclear reactors.

In one construction of liquid metal cooled fast breeder nuclear reactor wherein the reactor core, intermediate heat exchangers and liquid metal pumps are immersed in a pool of coolant such as sodium, the intermediate heat exchangers are suspended from the roof of the construction. Ducting in the form of a core tank or core shroud, interconnected with pods housing the intermediate exchangers, is provided for directing coolant from the core over the heat exchanger tubes thence back to the main pool of liquid metal. Seals are provided between the intermediate heat exchanger shells and the walls of their pods to prevent liquid metal flow by-passing the heat exchanger tube bundles. As the heat exchangers must be withdrawable for servicing and because linear differential thermal expansion of the heat exchanger and its pod must be accommodated, the seals hitherto have been of the sliding kind generally known as piston ring type seals. There are several disadvantages with this kind of seal when used for the hereinbefore described purpose, for example, sealing is not absolute, the metal-to-metal seal causes wear and fretting by rubbing and vibration, which eventually could lead to seisure and the seal could become jammed by the deposition of impurities in the liquid metal coolant. Yet another difficulty resides in the need to accommodate lateral thermal expansion of the ducting including the core tank and pods. Hitherto some expansion has been accommodated by expansible bellows pairs in the interconnections or, alternatively, by local deformations of the core tank and pods. Expansible bellows need to be very flexible and hence constitute a weak section of the ducting, local deformations of the ducting give rise to high stress levels which could lead to premature failure of the ducting.

SUMMARY OF THE INVENTION

According to the invention in a liquid metal cooled fast breeder reactor having a heat exchanger within a housing immersed in a pool of reactor coolant there is gas pocket trapping means for effecting a seal against vertical liquid flow between the heat exchanger shell and the wall of the heat exchanger housing, the gas pocket trapping means comprising a series of spaced generally co-axial skirts extending from the lower end wall of the heat exchanger shell to define a plurality of gas retaining jackets and a complementary series of generally co-axial inverted skirts extending upwardly from the housing to define liquid retaining jackets, an inverted skirt extending into each of the gas retaining jackets, gas pockets being bounded by the upper regions of the jackets and the surfaces of liquid metal in the liquid retaining jackets. A gas pocket seal does not suffer the aforementioned disadvantages of a metal-to-metal seal and can accommodate the lateral thermal expansion hitherto accommodated by expansible bellows pairs or local deformations of the ducting. A construction of nuclear reactor according to the invention requires no increase (relative to conventional liquid metal cooled fast breeder nuclear reactors) in the cross-section of the heat exchanger pod and the required additional length (also relative to conventional liquid metal cooled fast breeder nuclear reactors) is small. Furthermore, the gas pocket system can be designed such that in the event of leakage occurring through the skirts and one or more of the gas or liquid retaining jackets, the remaining gas or liquid retaining jackets will still provide a seal until such time as it is convenient for the heat exchanger to be withdrawn from the pod for servicing.

DESCRIPTION OF THE DRAWINGS

By way of example, a constructional embodiment of the invention will now be described with reference to the accompanying drawings wherein.

DESCRIPTION OF THE PREFERRED EMBODIMENTS

Figure 1:
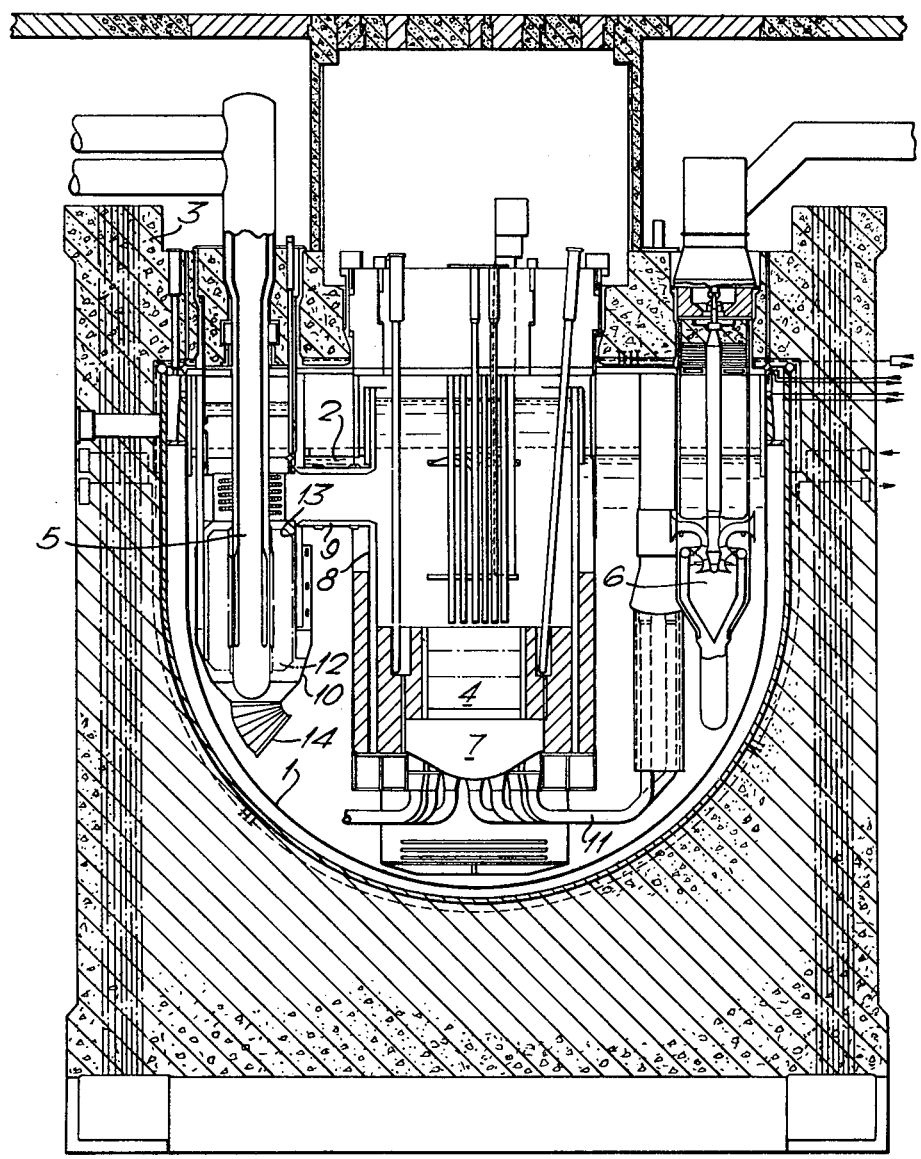
FIG. 1 is a sectional illustration of a typical liquid metal cooled fast breeder nuclear reactor construction of the pool kind.

In the construction of liquid metal cooled fast breeder reactor shown in FIG. 1 there is a primary vessel 1 suspended from the roof of a concrete containment structure 3 and containing a pool of liquid sodium 2. The nuclear reactor core 4, heat exchangers 5 and sodium circulating pumps 6 are suspended from the roof and are immersed in the pool of liquid sodium. In this construction there are four heat exchangers 5 and four pumps 6 disposed about the core but only one of each is shown. The reactor core is carried on a diagrid 7 and is surrounded by a core tank 8 which has connections 9 with housings 10 for the heat exchangers. Flow of coolant sodium is from the pool 2 by way of pumps 6 and pipes 11 to the underside of the core, thence from the core tank 8 to the heat exchanger housings 10 by way of connections 9. Flow is then over each of the heat exchanger tube bundles 12 within shells 13 and thence back to the pool by way of outlet ports 14 at the lower ends of the heat exchanger housing. The present invention resides in a seal for preventing coolant passing between the heat exchanger shell 13 and the wall of the housing 10 thereby bypassing the heat exchanger tube bundle 12.

Figure 2:
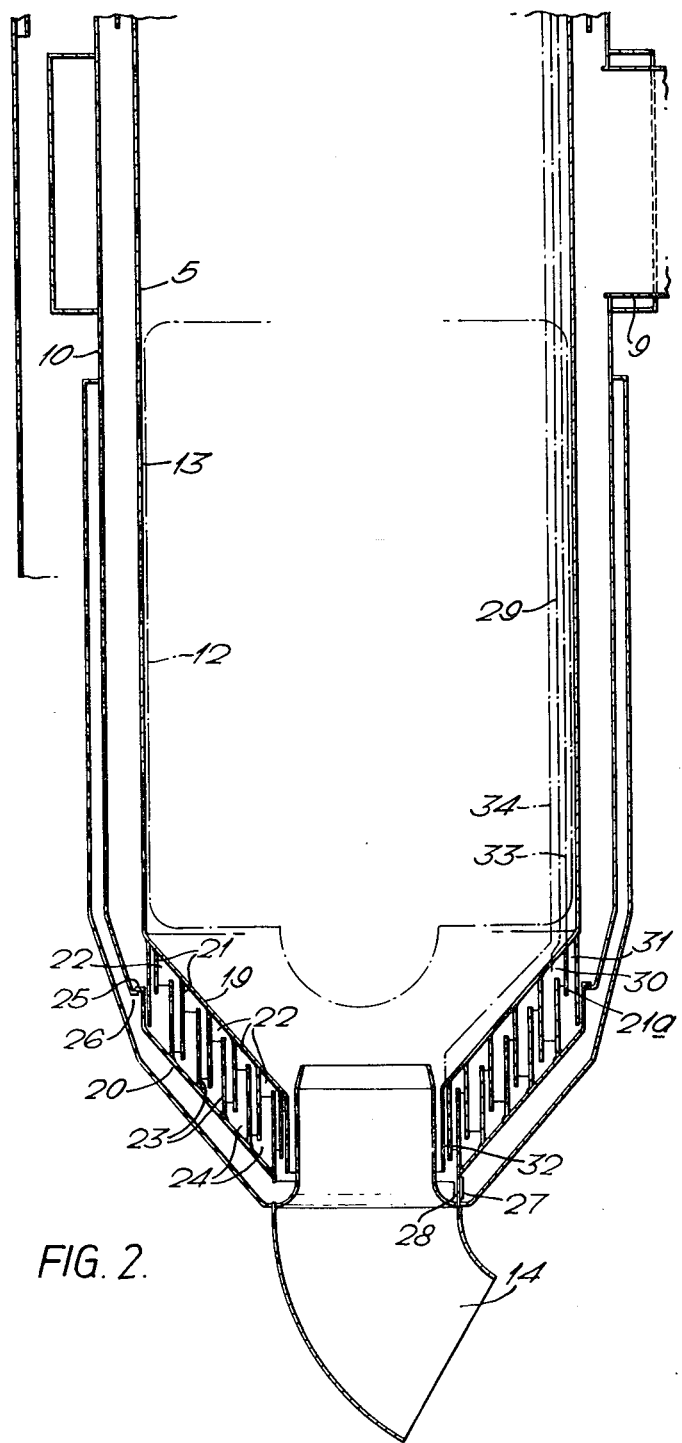
FIG. 2 is a diagrammatic illustration in section of a construction of heat exchanger housed within a pod of the reactor construction.

Referring now to FIG. 2, the heat exchanger 5 and housing 10 are shown diagrammatically. The heat exchanger shell 13 surrounds the heat exchanger tube bundle 12 (shown in broken line) and is spaced from the wall of the housing so that the heat exchanger can be freely withdrawn from the upper end of the housing for servicing. The heat exchanger shell 13 has a frustro-conical lower end wall 19 enclosing the end of the heat exchanger tube bundle 12 and the lower end wall 20 of the housing is of complementary shape. The seal against liquid flow between shell 13 and wall of the housing 10 is effected by pockets of gas.

The gas pocket trapping means comprises a series of spaced co-axial skirts 21 extending from the lower end wall 19 of the shell to define a plurality of gas retaining jackets 22. There is a complementary series of co-axial inverted skirts 23 extending upwardly from the end wall 20 of the housing to define liquid retaining jackets 24. The inverted skirts 23 each extend into a gas retaining jacket 22 and the gas pockets are bounded by the upper regions of the jackets and the surfaces of the liquid sodium in the liquid containing jackets. The end wall 20 has a circumferential flange 25 which is supported by an inwardly extending flange 26 of the housing wall and the end wall is centrally located by a sleeve 27 which engages a spigot 28 of the outlet port 14. This arrangement enables the lower end wall 20 of the housing to be removable from the housing when the heat exchanger has been withdrawn to enable defective skirts 23 to be repaired or replaced. The gaseous atmosphere within the primary vessel is argon so that on insertion of a heat exchanger in its housing argon is trapped within the gas retaining jackets to form the gas pocket seals. However means is also provided for re-establishing a gas seal where necessary, the means comprising a gas supply duct 29 extending downwardly within the heat exchanger shell from outside the reactor vault to the outermost (designated 30) of the gas pockets. The structure also has inner and outer skirts radially spaced from and bounding the series of gas retaining jackets to provide liquid containing jackets, designated 31, 32 outside and inside of the series of gas retaining jackets both of which are vented to instrumentation outside the reactor, by way of ducts 33, 34. The outermost skirt designated 21a of the outermost gas retaining jacket is of shorter length than the remaining skirts 21, so that when gas pressure is applied to the gas pocket 30 by way of the duct 29 the level of the sodium is depressed to below the skirt 21a, and enables gas to enter the outer liquid containing jacket 31. The appearance of the gas at the instrumentation by way of duct 33 indicates that the seal is operative whilst in the event that gas appears at the instrumentation from the liquid jacket 32 by way of duct 34 it is clear that sufficient of the skirts forming the inner gas retaining jackets of the series are defective to render the seal ineffective. In the event that no gas appears at the instrumentation from either the liquid jacket 31 or the liquid jacket 32 it is clear that the frustro-conical sections 19 or 20 are defective. Because there is a substantial clearance between the inverted skirts, 23 and the walls of the gas retaining jacket 22 to accommodate thermal expansion, a substantially rigid inter-connection between the heat exchanger housing 10 and the core tank 8 can be made.

The described construction provides an absolute seal against fluid flow between the heat exchanger shell and the housing and avoids rubbing, fretting or wearing of metal-to-metal surfaces. The construction has the ability to absorb lateral and axial movements caused by vibration and temperature variations, thus avoiding high stress problems. There is also the provision of redundancy whereby one or more of the gas pockets can be defective without loss of seal. Periodic checks can readily be made to detect failure of the seal system or it can be monitored continuously if warning of a seal failure is required immediately. Seal components are removable and replaceable and where necessary the seal can be re-established readily without the need for displacement of the heat exchanger in its pod.

I claim:

1. A liquid metal cooled fast breeder nuclear reactor comprising:
   a pool of liquid coolant within a closed container having a roof,
   a housing extending from the roof of the container into the coolant and having a lower end wall,
   a heat exchanger having a tube bundle and depending from the roof of the container within but spaced from the housing and immersed in the pool of coolant, the heat exchanger having a shell with side walls surrounding said tube bundle, said shell having a lower end wall carrying a multiplicity of downwardly extending generally co-axial skirts defining a series of gas retaining jackets at the lower end of the shell, and the lower end wall of the heat exchanger housing having a multiplicity of generally coaxial inverted skirts defining a series of liquid containing jackets, one inverted skirt extending into each gas retaining jacket, the gas retaining jackets each containing a pocket of gas bounded by the upper regions of the gas containing jackets and the surfaces of the coolant in each side of the associated inverted skirts, said downwardly extending skirts and the gas retaining jackets thereby defined being within the lateral extent of the side walls of the shell so as to minimize the lateral extent of the heat exchanger.

2. A liquid metal cooled fast breeder nuclear reactor according to claim 1 wherein the lower end wall of the heat exchanger housing is demountable, the end wall being upwardly withdrawable from the housing body when the heat exchanger is removed.

3. A liquid metal cooled fast breeder nuclear reactor according to claim 2 wherein the heat exchanger shell has inner and outer skirts radially spaced from and bounding the series of gas retaining jackets to define inner and outer liquid containing jackets, and gas ducts extending from the roof of the container to the outermost gas retaining jacket, and to the inner and outer liquid containing jackets.

* * * * *